United States Patent [19]

Kakita et al.

[11] 4,398,614
[45] Aug. 16, 1983

[54] COMBINATORIAL WEIGHING SYSTEM WITH DISCHARGE CONTROL

[75] Inventors: Yukio Kakita; Yoshiharu Mikami, both of Shiga, Japan

[73] Assignee: Kabushiki Kaisha Ishida Koki Seisakusho, Kyoto, Japan

[21] Appl. No.: 331,789

[22] Filed: Dec. 17, 1981

[30] Foreign Application Priority Data

Jan. 12, 1981 [JP] Japan .................................. 56-3354

[51] Int. Cl.³ ..................... G01G 19/22; G01G 21/28; G01G 13/16; G01G 13/24
[52] U.S. Cl. ........................................ 177/25; 177/58; 177/59; 177/114
[58] Field of Search ..................... 177/25, 58, 59, 114; 222/510

[56] References Cited

U.S. PATENT DOCUMENTS 1,439,259  12/1922  Pasnik .................................. 222/510
4,344,492  8/1982  Hirano .................................. 177/25

Primary Examiner—George H. Miller, Jr.
Attorney, Agent, or Firm—Armstrong, Nikaido, Marmelstein & Kubovcik

[57] ABSTRACT

A combinatorial weighing system designed for weighing out a desired number or weight of articles, wherein groups of articles are respectively weighed by a plurality of weighing machines, combinatorial addition is performed on all or a fixed number of possible combinations for weighed values obtained, a particular combination whose combination value is equal or the closest to a set value is selected, and articles are discharged from the weighing hoppers corresponding to the selected combination. It is contemplated to improve performance of this system by ensuring that groups of articles successively discharged from the weighing hoppers are collected separately one from the other without intermingling. To that end, an intermediate shutter is provided in a collecting chute.

6 Claims, 4 Drawing Figures

COMBINATORIAL WEIGHING SYSTEM WITH DISCHARGE CONTROL

The present invention relates to a combinatorial weighing system and more particularly to a method and apparatus for collecting articles weighed out in such a combinatorial weighing system.

A combinatorial weighing system comprising a plurality of weighing sections, computes combinations on the basis of weight values indicated by the weighing sections, searches for a particular combination whose addition value is equal or closest to a set value (weight or number of articles) and decides it as a combination for discharge.

The combinatorial weighing and collection of articles weighed out in this type of combinatorial weighing system are performed, for example, in the following manner: Groups of articles fed into a plurality of weighing hoppers are weighed by weighing machines associated with the weighing hoppers, addition values are computed of any desired number of combinations or all possible combinations of the weight values thus obtained, the addition values are individually compared with a set weight to find a particular combination whose addition value is equal or closest to the set weight, and articles are discharged from the corresponding hoppers into a discharge chute and then collected in a timing hopper. There is another arrangement wherein weight values indicated by the weighing machines are each divided by the single-article weight to convert each value into the number of articles, addition is performed on each of the combinations of these numbers to find a particular addition value equal or closest to a set number and articles are discharged and collected.

In each case, very accurate computations can be performed but recently there has been a requirement for improved weighing capability. In order to improve weighing capability, however, it is important to increase the feed rate, weighing rate and discharge rate of articles and to efficiently collect articles discharged in each weighing operation.

Of these three rates, it is possible to increase the weighing and discharge rates, but what matters most is the rate of collection of articles. More particularly, collection of articles, which are selected by combinatorial operation and discharged, at, e.g., twice the conventional rate of collection is attended with a difficulty that because of the distance between respective weighing hoppers and the timing hopper, articles discharged the last time mix with those discharged this time. Further, if the number of weighing machines is increased to increase the weighing accuracy, the chute must be correspondingly increased in size and the distance referred to above becomes longer. As a result, articles discharged in two successive operations mix with each other or articles fall at a greater speed and collide against articles at the discharge port of the collecting chute, with possible damage to these articles.

The present invention is intended to solve the prior art problems described above and improve the capability of the combinatorial weighing system.

In an embodiment of the present invention, the respective weights of groups of articles fed into a plurality of weighing hoppers are measured by weighing machines associated with the weighing hoppers, combinations of the obtained weight values are computed to select a particular combination whose addition value is equal or closest to a set weight or a set number, the weighing hoppers corresponding to the selected combination are opened to discharge articles into a collecting chute, a timing hopper disposed below the discharge port of the collecting chute is opened at the same time as the opening of the weighing hoppers, while an intermediate shutter suspended above the discharge port of the collecting chute is vertically moved in accordance with the falling speed of articles in response to a signal sent from the timing hopper so as to separate the articles discharged from the weighing hoppers from those to be discharged in the next cycle, in the intermediate region of the collecting chute and are collected in the timing hopper. Therefore, even if the weighing and discharge rates of articles are increased, e.g., twofold, the presence of the intermediate shutter separates articles discharged the last time from those to be discharged this time so as to collect them in the timing hopper, thus preventing mixing of articles and improving the weighing capability and collecting operation. The distance from the intermediate shutter to the lower timing hopper is approximately half the distance from the weighing hoppers to the timing hopper, so that the falling speed of discharged articles is low and there is no danger of articles colliding against each other at the discharge port of the collecting chute; this leads to prevention of damage to articles. Further, the invention can be applied to a large-sized collecting chute and improved weighing accuracy can be easily attained by increasing the number of weighing machines, which is allowed by the use of such large-sized collecting chute. Thus, the invention is very useful.

These and other objects and features of the invention will become more apparent from the following description to be given with reference to the accompanying drawings, in which.

Figure 1:
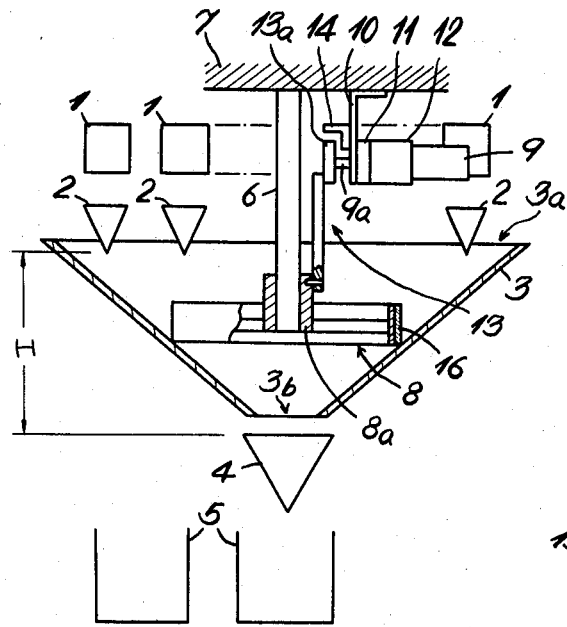
FIG. 1 is a schematic elevational sectional view of an embodiment of an article collecting apparatus in a combinatorial weighing system according to the invention.

In FIG. 1, the numeral 1 denotes weighing machines; 2 denotes weighing hoppers respectively associated with the weighing machines 1; 3 denotes a collecting chute; 4 denotes a timing hopper; and 5 denotes buckets operatively connected to a packaging machine or the like. There are provided article feeders (not shown) respectively associated with the weighing hoppers 2. It is possible to use feeders of the known type designed such that when the associated weighing hoppers have discharged articles and become empty, the feeders are each started to feed a single article or a set number of articles or a set weight of articles to the associated weighing hoppers and then stop.

Figure 2:
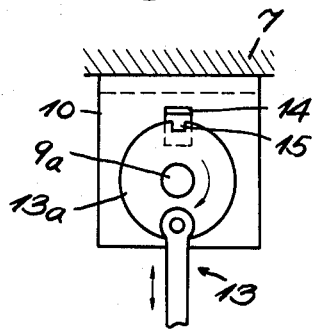
FIG. 2 is an enlarged view of a portion of the apparatus shown in FIG. 1.

The numeral 6 denotes a main shaft disposed centrally above the inlet port 3a of the collecting chute 3 and suspended from the lower surface of a frame 7; and 8 denotes an intermediate shutter vertically movably installed on the lower end of the main shaft 6. The numeral 9 denotes a motor which, through a speed reducer 11 and a clutch brake 12, is attached to a bracket 10 suspended from the frame 7 at a predetermined position; and 13 denotes a crank mechanism interposed between the main shaft 9a of the motor and the boss 8a of the intermediate shutter 8. The numeral 14 denotes a sensor, e.g., photocell, disposed at a predetermined position on one side of the bracket 10 and adapted to accurately stop the rotation of the motor 9 by sensing the light passing through a notch 15 formed in the cam 13a of the crank mechanism 13, as best seen in FIG. 2.

The intermediate shutter 8 comprises an elastic buffer member 16, e.g., "bancoran" (hardness of about 70), bonded to the vertical (i.e., cylindrical) outer peripheral surface and is positioned about half the distance, the so-called "head" H, between the weighing hoppers 2 and the timing hopper 4, so that it contacts the inner peripheral surface of the collecting chute 3. In addition, the intermediate shutter 8 may be of any desired shape, e.g., circular or polygonal, corresponding to the shape of the collecting chute 3. Further, the other peripheral surface may be oblique (i.e., conical) instead of vertical as shown. The operation timing for the intermediate shutter 8 is controlled by signals from the timing hopper 4.

Figure 3:
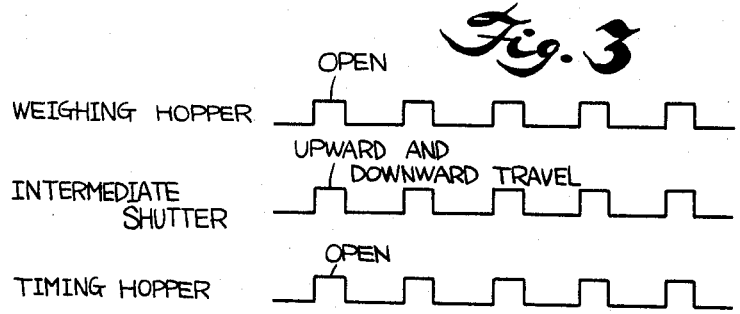
FIGS. 3 and 4 are time charts each showing an operation timing for the apparatus of FIG. 1.

The manner of collecting articles in the apparatus described above will now be described with reference to the time charts shown in FIGS. 3 and 4.

At the start of operation according to these time charts, it is assumed that the weighing hoppers 2, the intermediate shutter 8 in the collecting chute 3 and the timing hopper 4 have been closed, that each weighing hopper 2 has been fed with articles, and that articles according to optimum combinations have been fed to the intermediate shutter and the timing hopper, respectively.

In cases where articles with low friction, such as wrapped candy, are to be collected at twice the usual speed in order to increase the weighing capability, articles which have been fed to the weighing hoppers 2 are weighed by the weighing machines 1, addition is performed on the respective combinations of the indicated weight values, and a particular combination whose addition value is equal or closest to a set weight is selected, whereupon the weighing hoppers 2 corresponding to the optimum combination are opened to discharge articles to the collecting chute 3. At this time, as can be seen in FIG. 3, the timing hopper 4 is opened simultaneously with the weighing hoppers 2 to discharge articles contained therein into the bucket 5 located below. A signal is sent from the timing hopper 4 to the intermediate shutter 8, so that the intermediate shutter 8 is raised through the crank mechanism 13 by the driving of the motor 9 to allow the articles fed at the ½H position to be collected in one place therebelow, i.e., the timing hopper 4. In this case, the time required for the intermediate shutter 6 to make one upward and downward travel is set such that it completes its travel before the articles discharged from each weighing hopper 2 reach the ½H position. Further, it is so arranged that the closing of the weighing hoppers 2 and timing hopper 4 is effected immediately after the discharge of articles.

Thus, as soon as the weighing hoppers 2 are opened, they discharge articles along the inner surface of the collecting chute 3, and the presence of the intermediate shutter 8 positioned at ½H allows the articles to strike the elastic buffer member 16 bonded to the other peripheral surface thereof for shock absorption. Since the time required for the intermediate shutter 8 to make one upward and downward travel is set such that it completes its travel before articles discharged from weighing hoppers 2 reach the intermediate shutter 8 positioned at half the head H, as described above, the intermediate shutter 8 intercepts the articles discharged from weighing hoppers 2 at the ½H position in the collecting chute 3.

The articles intercepted at the ½H position are allowed to descend along the inner surface of the collecting chute 3 at the same time as the intermediate shutter 8 is raised, the articles being discharged into the timing hopper 4 through the discharge port 3b. As a result, even if the articles are discharged at high speed from the weighing hoppers 2, the presence of the intermediate shutter 8 in the collecting chute 3 ensures that groups of articles are completely separated at each cycle and successively collected in the timing hopper 4. Further, since the intermediate shutter 8 has its outer peripheral surface shaped vertical (i.e., cylindrical), articles fed simultaneously with its upward movement can be discharged downwardly and when it lowers it will accurately stop at the predetermined position as soon as the photocell 14 disposed at the predetermined position on the bracket 10 receives light. Further, since the head of articles discharged by the upward travel of the intermediate shutter 8 is equal to half the distance to the timing hopper 4, i.e., ½H, the falling speed thereof is low, preventing the articles from crashing against each other at the discharge port 3b of the collecting chute 3.

The timing hopper 4 discharges articles into the bucket 5 therebelow as soon as it is opened, and immediately after discharge, it is closed to be ready to collect articles to be discharged at the next cycle. By discharging articles from the weighing hoppers 2 in the manner described, it is possible to perform continuous article collecting operation.

Figure 4:
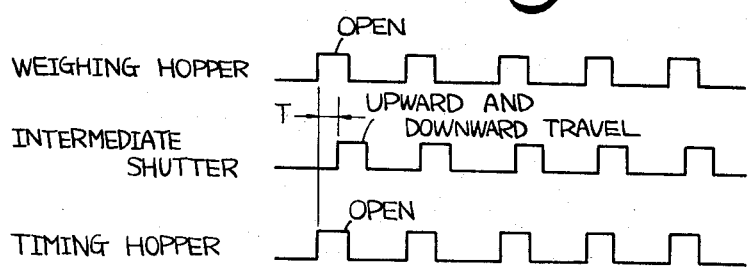

The time chart of FIG. 4 illustrates an operation timing for collecting articles with high friction, such as macaroni. In the case of collecting articles with high friction, since the time taken for articles to fall from the weighing hoppers 2 to the timing hopper 4 via the collecting chute 3 is greater than that required for articles with low friction described with reference to FIG. 3, the upward travel of the intermediate shutter 8 must be arranged to correspond to the falling speed of articles. Thus, when the weighing hoppers corresponding to a selected optimum combination are opened to discharge articles, the timing hopper 4 is simultaneously opened as in the case of FIG. 3 so that the articles contained therein are discharged into the bucket 5 therebelow while the above-described signal from the timing hopper 4 is sent to the intermediate shutter 8 with a lag corresponding to a timer time T to cause the intermediate shutter 8 to travel upward so as to discharge articles into the timing hopper 4. In addition, it goes without saying that the intermediate shutter 8 is set such that it completes one upward and downward travel before the articles discharged from the weighing hoppers 2 reach the ½H position in the collecting chute 3.

The method of computing combinations in this invention is not limited to the one described herein merely by way of explanation. For example, rather than storing all combination weights which are the results of combinatorial computations, each time the computation of a combination is completed, it is compared with the set weight and only that one of the combinations computed so far which is the nearest to the set weight is stored, so that when all combinations have been computed, a particular combination which is equal or the nearest to the set weight will have been found.

The description so far has been given with reference to combinatorial weighing taken as an example, but the present invention may, of course, be likewise applied to combinatorial counting. More particularly, the invention may be embodied by weighing groups of articles, dividing the weight of each group by the weight of a single article to find the number of articles in each group, performing addition on each combination of the numbers to find a combination equal or closest to a set number, and discharging the articles corresponding to that combination. Therefore, in the present invention, the term "combinatorial weighing" includes the meaning of "combinatorial counting". Combinatorial operation for the latter case may be performed by any desired method. Further, conditions for a set value for discharge may be set as desired, such as number alone or number plus weight.

As many apparently widely different embodiments of this invention may be made without departing from the spirit and scope thereof, it is to be understood that the invention is not limited to the specific embodiments thereof except as defined in the appended claims.

What is claimed is:

1. A combinatorial weighing system comprising a plurality of weighing hoppers, a plurality of weighing machines respectively associated with said weighing hoppers for weighing articles received in the latter, an arithmetic section for performing combinatorial operation on the basis of weighed data from said weighing machines, searching for a combination whose addition value is equal or closest to a set value and sending discharge signals to the weighing hoppers corresponding to the searched-for combination, a collecting chute for collecting articles discharged from said weighing hoppers and dropping them into a timing hopper situated thereunder, a shutter located, within the collecting chute, above the discharge port of said collecting chute, and a drive unit for opening and closing said shutter in response to a signal from said timing hopper.

2. A system as set forth in claim 1 wherein the timing for operation of said shutter is adjustable in relation to the falling speed of articles along the collecting chute.

3. A combinatorial weighing method comprising the steps of weighing groups of articles received in a plurality of weighing hoppers by a plurality of weighing machines respectively associated with the weighing hoppers, computing combinations of weight values obtained to search for a combination whose addition value is equal or the closest to a set value, causing the weighing hoppers corresponding to the searched-for combination to discharge articles toward a collecting chute, opening a timing hopper situated under the discharge port of the collecting chute simultaneously with the opening of said weighing hoppers, and actuating a shutter located, within the collecting chute, above the discharge port of said collecting chute in response to a signal from said timing hopper, whereby groups of articles successively discharged from the weighing hoppers are collected separately one from the other.

4. A method as set forth in claim 3 wherein the timing for operation of said shutter is adjustable in relation to the falling speed of articles along the collecting chute.

5. An apparatus for collecting articles in a combinatorial weighing system, comprising a collecting chute for receiving articles from a plurality of weighing hoppers, a timing hopper located below the discharge port of said collecting chute, and a shutter located, within the collecting chute, above the discharge port of said collecting chute and a drive unit for opening and closing said shutter.

6. An apparatus as set forth in claim 5 wherein the timing for operation of said shutter is adjustable in relation to the falling speed of articles along the collecting chute.

* * * * *